United States Patent
Koester et al.

(10) Patent No.: US 9,996,294 B2
(45) Date of Patent: Jun. 12, 2018

(54) DYNAMICALLY MANAGING A TABLE OF CONTENTS

(71) Applicant: International Business Machines Corporation, Armonk, NY (US)

(72) Inventors: Michael J. Koester, Hollister, CA (US); Kevin L. Miner, Apopka, FL (US); Trinh Huy Nguyen, San Jose, CA (US); Carrie J. Van Noorden, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 15/013,940

(22) Filed: Feb. 2, 2016

(65) Prior Publication Data

US 2017/0220288 A1    Aug. 3, 2017

(51) Int. Cl.
*G06F 3/06* (2006.01)

(52) U.S. Cl.
CPC .......... *G06F 3/0632* (2013.01); *G06F 3/0604* (2013.01); *G06F 3/067* (2013.01); *G06F 3/0608* (2013.01); *G06F 3/0673* (2013.01)

(58) Field of Classification Search
CPC .................................................... G06F 3/0632
USPC ......................................................... 711/172
See application file for complete search history.

(56) References Cited

U.S. PATENT DOCUMENTS

| | | | |
|---|---|---|---|
| 8,782,360 B2 | 7/2014 | Cammarata et al. | |
| 8,880,837 B2 | 11/2014 | Dudgeon et al. | |
| 9,122,400 B2 | 9/2015 | Helak et al. | |
| 2009/0210617 A1* | 8/2009 | Lehr | G06F 3/0617 711/112 |
| 2015/0074051 A1 | 3/2015 | Gensler et al. | |
| 2015/0355840 A1* | 12/2015 | Carpenter | G06F 3/0604 711/173 |

OTHER PUBLICATIONS

IBM. DFSMSdfp Advanced Services. Mar. 2007. IBM. 8$^{th}$ ed. SC26-7400-07.*
Anonymous. "Printing the Format-5/7 DSCB (Free Space) of an Operating System DASD Device." Oct. 2013. ip.com.*
RedHat. Logical Volume Manager Administration. 2014. https://access.redhat.com/documentation/en-US/Red_Hat_Enterprise_Linux/5/pdf/Logical_Volume_Manager_Administration/Red_Hat_Enterprise_Linux-5-Logical_Volume_Manager_Administration-en-US.pdf. pp. 33-39.*
"Volume Table of Contents." Aug. 2014. https://en.wikipedia.org/w/index.php?title=Volume_Table_of_Contents&oldid=619507495.*

* cited by examiner

*Primary Examiner* — Nathan Sadler
(74) *Attorney, Agent, or Firm* — Zilka Kotab, P.C.

(57) ABSTRACT

A computer-implemented method according to one embodiment includes receiving a request to initialize a storage device, identifying a size of the storage device to be initialized, determining a size of a table of contents and a location for the table of contents within the storage device, based on the identified size of the storage device to be initialized, determining a type of the table of contents; and initializing the storage device, utilizing the determined size of the table of contents, the determined location for the table of contents, and the determined type of the table of contents.

9 Claims, 6 Drawing Sheets

DYNAMICALLY MANAGING A TABLE OF CONTENTS

BACKGROUND

The present invention relates to data management, and more specifically, this invention relates to managing a table of contents within a storage volume.

A table of contents is an important component of a storage volume. However, current methods for creating and maintaining a table of contents within a storage volume exhibit various limitations. For example, currently, a table of contents is limited to a single extent of contiguous tracks. This restriction may be enforced even when increasing the size of an existing table of contents. Additionally, users creating and managing storage volumes currently have to manually create and manage many aspects of the table of contents within the storage volumes.

SUMMARY

A computer-implemented method according to one embodiment includes receiving a request to initialize a storage device, identifying a size of the storage device to be initialized, determining a size of a table of contents and a location for the table of contents within the storage device, based on the identified size of the storage device to be initialized, determining a type of the table of contents; and initializing the storage device, utilizing the determined size of the table of contents, the determined location for the table of contents, and the determined type of the table of contents.

According to another embodiment, a computer program product for dynamically managing a table of contents comprises a computer readable storage medium having program instructions embodied therewith, where the computer readable storage medium is not a transitory signal per se, and where the program instructions are executable by a processor to cause the processor to perform a method. The method comprises receiving, by the processor, a request to initialize a storage device, identifying, by the processor, a size of the storage device to be initialized, determining, by the processor, a size of the table of contents and a location for the table of contents within the storage device, based on the identified size of the storage device to be initialized, determining, by the processor, a type of the table of contents, and initializing, by the processor, the storage device, utilizing the determined size of the table of contents, the determined location for the table of contents, and the determined type of the table of contents.

A system according to another embodiment includes a processor and logic integrated with and/or executable by the processor, where the logic is configured to receive a request to initialize a storage device, identify a size of the storage device to be initialized, determine a size of a table of contents and a location for the table of contents within the storage device, based on the identified size of the storage device to be initialized, determine a type of the table of contents, and initialize the storage device, utilizing the determined size of the table of contents, the determined location for the table of contents, and the determined type of the table of contents.

Other aspects and embodiments of the present invention will become apparent from the following detailed description, which, when taken in conjunction with the drawings, illustrate by way of example the principles of the invention.

DETAILED DESCRIPTION

Figure 1:
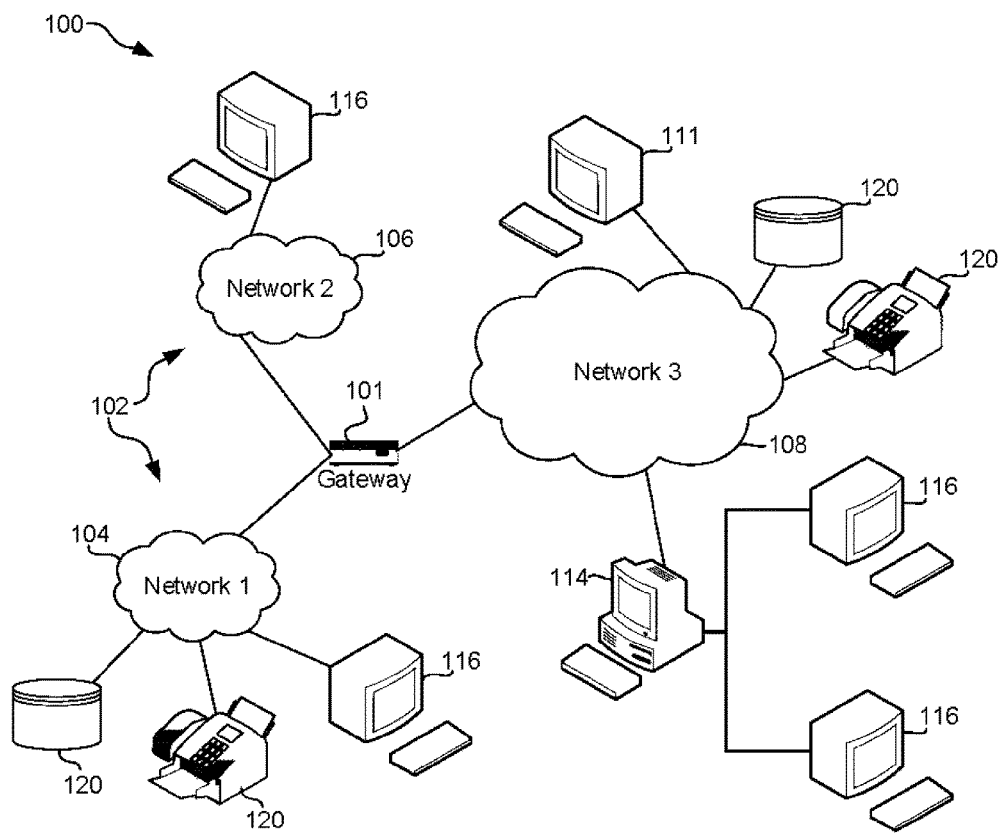
FIG. 1 illustrates a network architecture, in accordance with one embodiment.

The following description discloses several preferred embodiments of systems, methods and computer program products for dynamically managing a table of contents. Various embodiments provide a method to notify hardware storage of unallocated data that can then be read inhibited.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for dynamically managing a table of contents.

In one general embodiment, a computer-implemented method includes receiving a request to initialize a storage device, identifying a size of the storage device to be initialized, determining a size of a table of contents and a location for the table of contents within the storage device, based on the identified size of the storage device to be initialized, determining a type of the table of contents; and initializing the storage device, utilizing the determined size of the table of contents, the determined location for the table of contents, and the determined type of the table of contents In another general embodiment, a computer program product for dynamically managing a table of contents comprises a computer readable storage medium having program instructions embodied therewith, where the computer readable storage medium is not a transitory signal per se, and where the program instructions are executable by a processor to cause the processor to perform a method. The method comprises receiving, by the processor, a request to initialize a storage device, identifying, by the processor, a size of the storage device to be initialized, determining, by the processor, a size of the table of contents and a location for the table of contents within the storage device, based on the identified size of the storage device to be initialized, determining, by the processor, a type of the table of contents, and initializing, by the processor, the storage device, utilizing the determined size of the table of contents, the determined location for the table of contents, and the determined type of the table of contents.

In another general embodiment, a system includes a processor and logic integrated with and/or executable by the processor, where the logic is configured to receive a request to initialize a storage device, identify a size of the storage device to be initialized, determine a size of a table of contents and a location for the table of contents within the storage device, based on the identified size of the storage device to be initialized, determine a type of the table of contents, and initialize the storage device, utilizing the determined size of the table of contents, the determined location for the table of contents, and the determined type of the table of contents.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
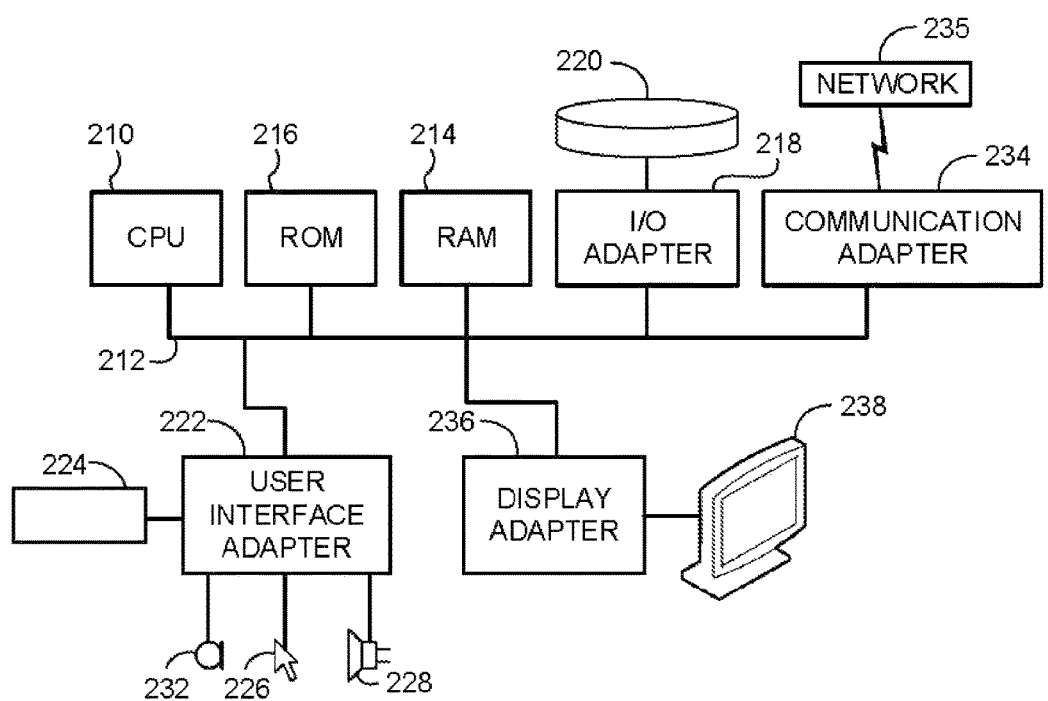
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
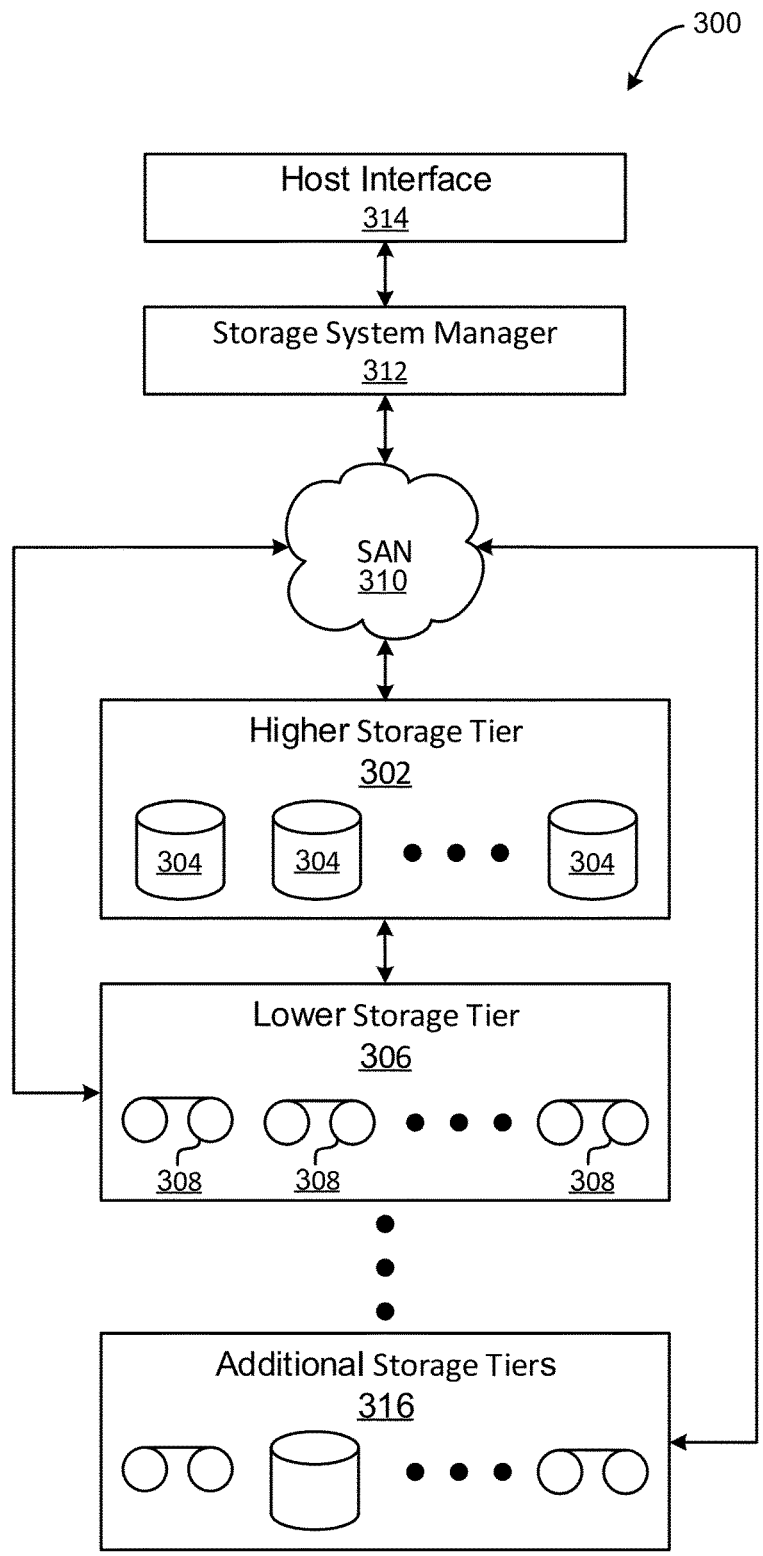
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
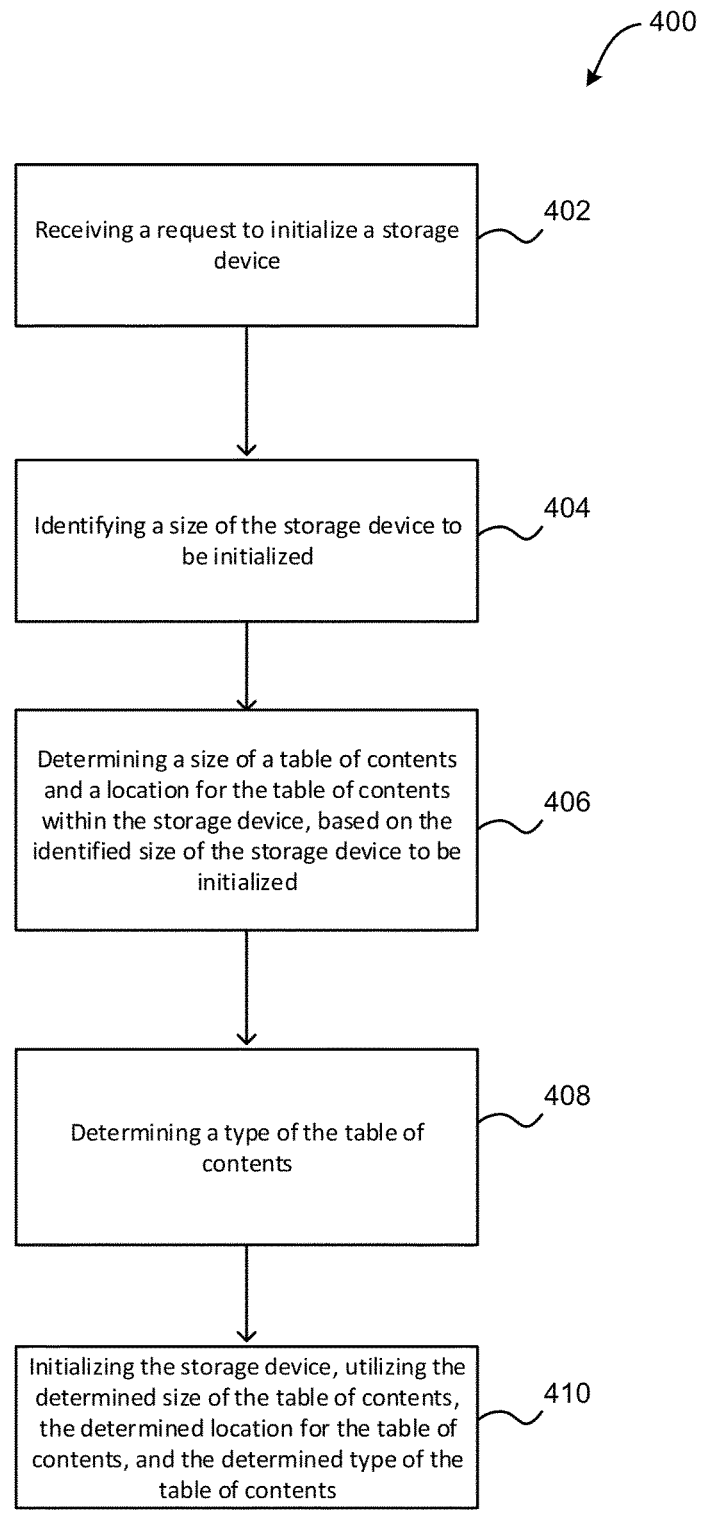
FIG. 4 illustrates a method for dynamically managing a table of contents, in accordance with one embodiment.

Now referring to FIG. 4, a flowchart of a method 400 is shown according to one embodiment. The method 400 may be performed in accordance with the present invention in any of the environments depicted in FIGS. 1-3 and 5, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a request is received to initialize a storage device. In one embodiment, the storage device may include a storage volume for storing data. For example, the storage device may include a direct access storage device (DASD) used to store data for one or more users. In another embodiment, the storage device may include physical storage space. For example, the storage device may include an extent-based file system that includes a plurality of physical tracks. In another embodiment, the storage device may include one or more hard disk drives, one or more memory units, one or more caches, etc. In yet another embodiment, the storage device may include a storage volume.

Additionally, in one embodiment, the request to initialize the storage device may be received from one or more users. For example, a system may receive a user request to add storage to an account associated with the user. In another embodiment, additional data may be received in association with the request. For example, a serial number (e.g., a volume serial number, etc.) associated with the storage device may be received within or in conjunction with the request to initialize the storage device.

Further, as shown in FIG. 4, method 400 may proceed with operation 404, where a size of the storage device to be initialized is identified. In one embodiment, the size of the storage device may include an amount of data (e.g., a number of bytes, etc.) able to be stored within the storage device. In another embodiment, the size of the storage device may be indicated within the request to initialize the storage device. In yet another embodiment, the size of the storage device may be determined from one or more default storage sizes.

Further still, as shown in FIG. 4, method 400 may proceed with operation 406, where a size of a table of contents and a location for the table of contents within the storage device are determined, based on the identified size of the storage device to be initialized. In one embodiment, the table of contents may include a data structure that enables the identification and location of data stored within the storage device. In another embodiment, the table of contents may store one or more instances of metadata. For example, the table of contents may store a size of stored data, a location of stored data, permissions associated with stored data, etc. In yet another embodiment, the table of contents may include a volume table of contents (VTOC) within a z/OS operating system. In another embodiment, the size of the table of contents may include a predetermined amount of data (e.g., a predetermined number of tracks, etc.) within the storage device that is reserved for use by the table of contents.

Additionally, in one embodiment, the table of contents may include one or more pointers. For example, user data within the storage device may be kept in one or more data sets, and pointers to these data sets may be maintained within one or more data set control block (DSCB) records in the table of contents. In another embodiment, the storage device may include an index data set that has pointers to data set DSCB records in the table of contents.

Also, in one embodiment, the size of the table of contents and the location for the table of contents within the storage device may be determined utilizing one or more algorithms. In another embodiment, the size of the table of contents may be determined as a predetermined percentage of the identified size of the storage device to be initiated. In yet another embodiment, the table of contents may be determined to be located at the beginning of the storage device, at the end of the storage device, or within a predetermined location of the storage device based on an analysis of the size of the storage device. In still another embodiment, the location for the table of contents within the storage device may include a place where the table of contents is stored within the storage device.

Furthermore, as shown in FIG. 4, method 400 may proceed with operation 408, where a type of the table of contents is determined. In one embodiment, the type of the table of contents may be determined based on one or more criteria. For example, the type of the table of contents may be determined based on an analysis of the size of the storage device to be initialized. In another example, the type of the table of contents may be determined based on one or more defaults. For example, the type of the table of contents may be a default type that is automatically selected.

In another embodiment, the type of the table of contents may include a state of the table of contents, a way in which data is stored within the table of contents, etc. For example, the type of the table of contents may include an operating system VTOC (OSVTOC) type where free space within the table of contents is mapped by free space records (e.g., data set control block (DSCB) records, etc.) within the VTOC. In another example, the type of the table of contents may include an indexed VTOC type where the VTOC index data set manages an allocation of space within the storage device.

Further still, as shown in FIG. 4, method 400 may proceed with operation 410, where the storage device is initialized, utilizing the determined size of the table of contents, the determined location for the table of contents, and the determined type of the table of contents. In one embodiment, initializing the storage device may include adding the storage device to a system. For example, the storage device may be physically or logically added to a system, where the system may be one of a plurality of systems within an environment (e.g., a sysplex, etc.). In another embodiment, initializing the storage device may include creating the table of contents, reserving a physical area of the storage device for the table of contents using a physical extent, and inserting the table of contents into the storage device, where the table of contents has the determined size of the table of contents, the determined location for the table of contents within the storage device, and the determined type of the table of contents.

Further still, in one embodiment, the initializing of the storage device may be performed automatically. For example, the initializing of the storage device may be performed by a system without the need for intervention or input by one or more users requesting to initialize the storage device. In this way, the creation and management of the table of contents within the storage device may be performed automatically without the need for manual intervention by one or more users.

Also, in one embodiment, it may be determined that an amount of data used by the table of contents within the storage device has reached a predetermined size. For example, it may be determined by the system that the table of contents is full or has a size that exceeds a threshold. In another example, it may be determined that the table of contents has used a predetermined amount of data (e.g., to store metadata, pointers, etc.) within the storage device that is reserved for use by the table of contents.

Additionally, in one embodiment, in response to the determination that the amount of data used by the table of contents within the storage device has reached the predetermined size, an additional portion of the table of contents that may or may not be contiguous to the table of contents may be created within the storage device. For example, an additional predetermined amount of data (e.g., a predetermined number of tracks, etc.) within the storage device may be reserved for use by the table of contents using an additional physical extent, where the additional predetermined amount of data may or may not be contiguous with/adjacent to the predetermined amount of data originally reserved for use by the table of contents.

In another embodiment, the additional portion of the table of contents may be linked to the table of contents within the storage device. For example, the original table of contents may be associated with a first physical extent within the storage device, the additional portion of the table of contents may be associated with a second physical extent within the storage device, and the first and second physical extents may be linked (e.g., via one or more pointers, etc.).

Furthermore, in one embodiment, the storage device may be analyzed, and the type of the table of contents may be changed, based on the analysis. For example, the type of the table of contents may include an OSVTOC type, and an analysis of a number of data sets within the storage device and a size of the storage device may indicate that changing the type of the table of contents to an indexed VTOC type may increase the performance of the storage device. In another example, the type of the table of contents may be switched from the OSVTOC type to the indexed VTOC type, in response to the analysis. In this way, a type of the table of contents may be dynamically adjusted for optimal performance of the storage device.

Further still, in one embodiment, an error associated with the table of contents may be identified and automatically resolved. For example, the type of the table of contents may include an indexed VTOC type, and the system may monitor the table of contents and may detect an error associated with the table of contents. In another example, in response to the error detection, the error may be resolved automatically by the system, which still maintaining the table of contents as an indexed VTOC type (e.g., without having to revert the table of contents to an OSVTOC type, etc.).

Figure 5:
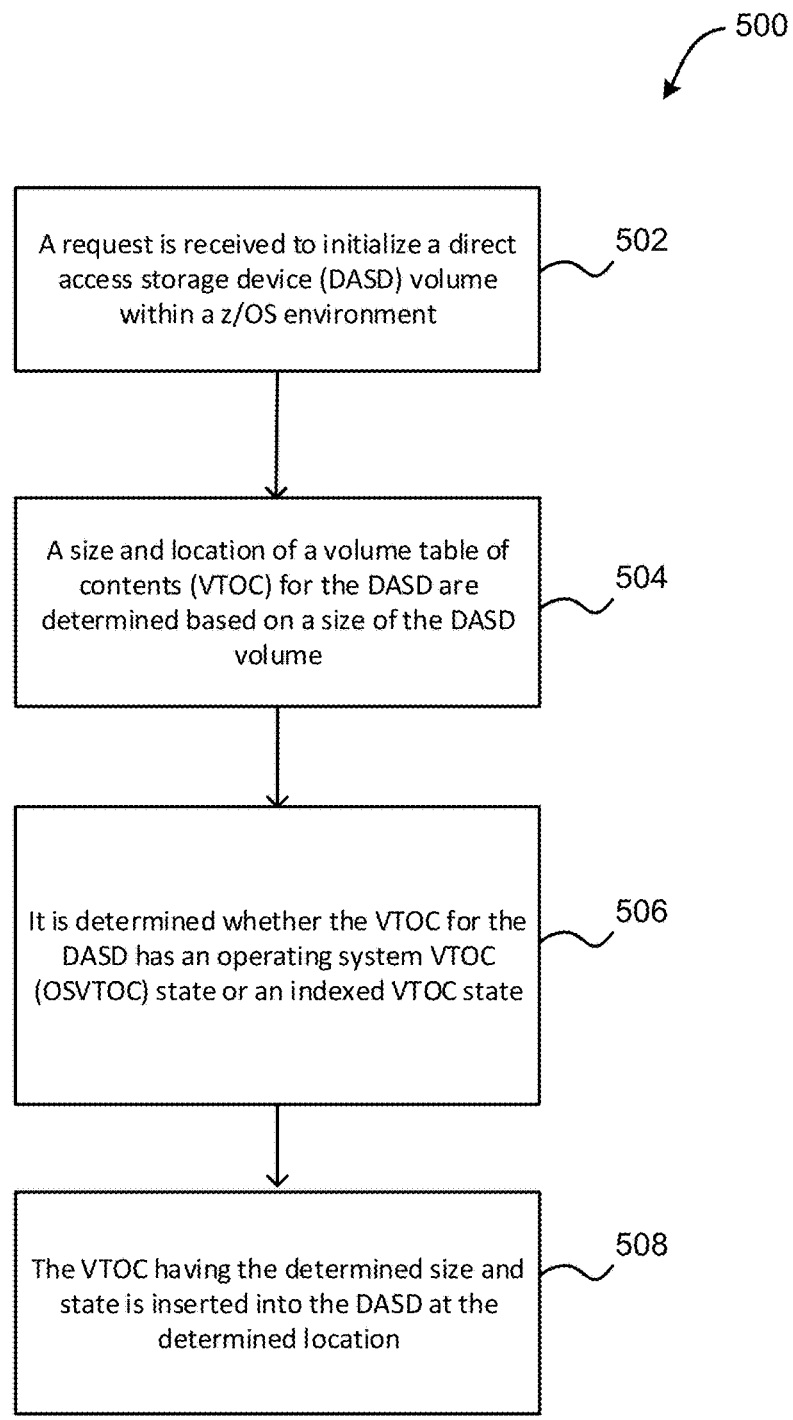
FIG. 5 illustrates a method for initializing a volume table of contents (VTOC) for a new storage volume, in accordance with one embodiment.

Now referring to FIG. 5, a flowchart of a method 500 for initializing a volume table of contents (VTOC) for a new storage volume is shown according to one embodiment. The method 500 may be performed in accordance with the present invention in any of the environments depicted in FIGS. 1-4 and 6, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a request is received to initialize a direct access storage device (DASD) volume within a z/OS environment. In one embodiment, the request may be received from a storage administrator associated with an account within the z/OS environment. For example, the storage administrator may request that additional storage be added to their associated account within a sysplex. In another embodiment, the request may include a volume serial number.

Additionally, method 500 may proceed with operation 504, where a size and location of a volume table of contents (VTOC) for the DASD are determined based on a size of the DASD volume. In one embodiment, the VTOC location and size may be determined using an algorithm that takes into consideration the size of the DASD volume.

Further, method 500 may proceed with operation 506, where it is determined whether the VTOC for the DASD has an operating system VTOC (OSVTOC) state or an indexed VTOC state. In one embodiment, a number of data sets on the DASD volume may be analyzed to determine whether the OSVTOC state or the indexed VTOC state provides the DASD volume with higher performance. In another embodiment, when the DASD volume is first initialized, it may be set as an OSVTOC until one or more datasets are allocated.

Further still, method 500 may proceed with operation 508, where the VTOC having the determined size and state is inserted into the DASD at the determined location. In one embodiment, DASD technology may use an array where data is distributed across disks, such that the physical location of the data is virtualized. In this way, a VTOC may be placed by the system in one or more of a variety of locations within the DASD volume. In another embodiment, if an indexed VTOC state is implemented, a size of the index may be determined based off the size of the VTOC. Further still, in one embodiment, the system may monitor the VTOC so that if an error is detected that would have normally disabled an indexed VTOC, the error may be fixed and the VTOC will remain indexed.

Figure 6:
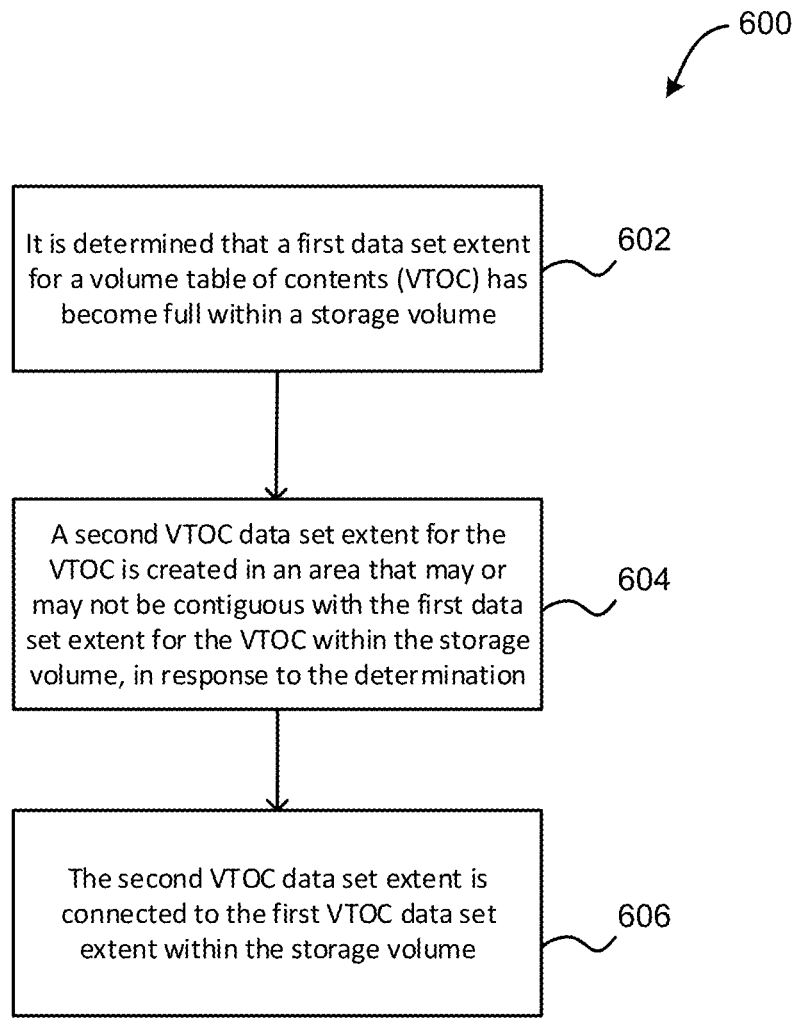
FIG. 6 illustrates a method for expanding a volume table of contents (VTOC), in accordance with one embodiment.

Now referring to FIG. 6, a flowchart of a method 600 for expanding a volume table of contents (VTOC) is shown according to one embodiment. The method 600 may be performed in accordance with the present invention in any of the environments depicted in FIGS. 1-5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where it is determined that a first data set extent for a volume table of contents (VTOC) has become full within a storage volume. In one embodiment, it may be determined that the VTOC has become full when all data allocated for the VTOC within a storage volume has been used by the VTOC. In another embodiment, the data allocated for the VTOC within a storage volume may be indicated by the data set extent. In yet another embodiment, the VTOC may include a record (e.g., the first record of the VTOC, etc.) which describes the device the volume resides on, the volume attributes, and the size and contents of the VTOC data set. In another example, the record in the VTOC may include a VTOC DSCB (format-4).

Additionally, method 600 may initiate with operation 604, where a second VTOC data set extent for the VTOC is created in an area that may or may not be contiguous with the first data set extent for the VTOC within the storage volume, in response to the determination. In one embodiment, the second VTOC data set extent may reserve an additional storage area (e.g., one or more tracks, etc.) within the storage volume.

Further, method 600 may initiate with operation 606, where the second VTOC data set extent is connected to the first VTOC data set extent within the storage volume. For example, a record located in the first VTOC data set extent (e.g., the VTOC DSCB (format-4), etc.) may be updated to point to the second VTOC data set extent. In another embodiment, additional space may be added to the storage volume dynamically.

In this way, creation of VTOC extents may be chained to the original VTOC by having the first VTOC extent point to the second VTOC extent, the second VTOC extent point to the third VTOC extent, and so on until the last VTOC extent is reached. By allowing the VTOC to be in multiple extents, the VTOC may grow if needed as data sets are allocated. This may eliminate a need for a storage administrator to have to manually expand the VTOC. In another embodiment, a unit control block (UCB) may point to the first data set extent for the VTOC.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:
1. A computer-implemented method, comprising:
  receiving a request to initialize a storage device, the request including a volume serial number associated with the storage device;
  identifying a size of the storage device, where the size is indicated within the request;

determining a size of a table of contents and a location for the table of contents within the storage device, based on the identified size of the storage device;

selecting a type of the table of contents from a plurality of different types, based on the identified size of the storage device; and automatically initializing the storage device, including:
  creating the table of contents,
  reserving a physical area of the storage device for the table of contents using a physical extent, and
  inserting the table of contents into the storage device, where the table of contents has the determined size of the table of contents, the determined location for the table of contents, and the selected type of the table of contents;

determining that an amount of data used within the table of contents within the storage device has reached a predetermined size, where the table of contents is associated with a first physical extent within the storage device;

creating an additional portion of the table of contents that is not contiguous to the table of contents within the storage device by reserving a predetermined number of tracks within the storage device using a second physical extent, in response to the determination that the amount of data used by the table of contents within the storage device has reached the predetermined size; and linking the additional portion of the table of contents to the table of contents within the storage device by linking the second physical extent to the first physical extent, utilizing a pointer.

2. The computer-implemented method of claim 1, wherein the table of contents stores a size of stored data, a location of the stored data, and permissions associated with the stored data.

3. The computer-implemented method of claim 1, wherein the type of the table of contents is selected from a group consisting of:
  an operating system volume table of contents (OSVTOC) type where free space within the table of contents is mapped by data set control block (DSCB) records within the table of contents, and
  an indexed volume table of contents (VTOC) type where a table of contents index data set manages an allocation of space within the storage device.

4. The computer-implemented method of claim 3, wherein the type of the table of contents is an OSVTOC type, and further comprising:
  analyzing a number of data sets within the storage device and the size of the storage device;
  determining that changing the type of the table of contents to an indexed VTOC type will increase a performance of the storage device, based on the analyzing; and
  switching the type of the table of contents from the OSVTOC type to the indexed VTOC type, based on the determining.

5. A computer program product for dynamically managing a table of contents, the computer program product comprising a non-transitory computer readable storage medium having program instructions embodied therewith, the program instructions executable by a processor to cause the processor to perform a method comprising:
  receiving, by the processor, a request to initialize a storage device, the request including a volume serial number associated with the storage device;
  identifying, by the processor, a size of the storage device, where the size is indicated within the request;
  determining, by the processor, a size of the table of contents and a location for the table of contents within the storage device, based on the identified size of the storage device to be initialized;
  selecting, by the processor, a type of the table of contents from a plurality of different types, based on the identified size of the storage device;
  automatically initializing, by the processor, the storage device, including:
    creating the table of contents, utilizing the processor,
    reserving, utilizing the processor, a physical area of the storage device for the table of contents using a physical extent, and
    inserting, utilizing the processor, the table of contents into the storage device, where the table of contents has the determined size of the table of contents, the determined location for the table of contents, and the selected type of the table of contents;
  determining, by the processor, that an amount of data used within the table of contents within the storage device has reached a predetermined size, where the table of contents is associated with a first physical extent within the storage device;
  creating, by the processor, an additional portion of the table of contents that is not contiguous to the table of contents within the storage device by reserving a predetermined number of tracks within the storage device using a second physical extent, in response to the determination that the amount of data used by the table of contents within the storage device has reached the predetermined size; and
  linking, by the processor, the additional portion of the table of contents to the table of contents within the storage device by linking the second physical extent to the first physical extent, utilizing a pointer.

6. The computer program product of claim 5, wherein the table of contents stores a size of stored data, a location of the stored data, and permissions associated with the stored data.

7. The computer program product of claim 5, wherein the type of the table of contents is selected from a group consisting of:
  an operating system volume table of contents (OSVTOC) type where free space within the table of contents is mapped by data set control block (DSCB) records within the table of contents, and
  an indexed volume table of contents (VTOC) type where a table of contents index data set manages an allocation of space within the storage device.

8. The computer program product of claim 7, wherein the type of the table of contents is an OSVTOC type, and further comprising:
  analyzing, utilizing the processor, a number of data sets within the storage device and the size of the storage device;
  determining, utilizing the processor, that changing the type of the table of contents to an indexed VTOC type will increase a performance of the storage device, based on the analyzing; and
  switching, utilizing the processor, the type of the table of contents from the OSVTOC type to the indexed VTOC type, based on the determining.

9. A system, comprising:
  a processor and logic integrated with the processor, executable by the processor, or integrated with and executable by the processor, the logic being configured to:

receive a request to initialize a storage device, the request including a volume serial number associated with the storage device;
identify a size of the storage device, where the size is indicated within the request;
determine a size of a table of contents and a location for the table of contents within the storage device, based on the identified size of the storage device to be initialized;
select a type of the table of contents from a plurality of different types, based on the identified size of the storage device;
automatically initialize the storage device, including:
   creating the table of contents,
     reserving a physical area of the storage device for the table of contents using a physical extent, and
     inserting the table of contents into the storage device, where the table of contents has the determined size of the table of contents, the determined location for the table of contents, and the selected type of the table of contents;

determine that an amount of data used within the table of contents within the storage device has reached a predetermined size, where the table of contents is associated with a first physical extent within the storage device;

create an additional portion of the table of contents that is not contiguous to the table of contents within the storage device by reserving a predetermined number of tracks within the storage device using a second physical extent, in response to the determination that the amount of data used by the table of contents within the storage device has reached the predetermined size; and link the additional portion of the table of contents to the table of contents within the storage device by linking the second physical extent to the first physical extent, utilizing a pointer.

\* \* \* \* \*